United States Patent
Silagy et al.

(10) Patent No.: US 6,667,101 B2
(45) Date of Patent: Dec. 23, 2003

(54) THERMOFORMABLE MULTILAYER FILM FOR THE PROTECTION OF SUBSTRATES AND OBJECTS OBTAINED

(75) Inventors: David Silagy, Evreux (FR); Jose Teixeira Pires, Bourg Achard (FR); Philippe Bussi, Bernay (FR); Anthony Bonnet, Serquigny (FR)

(73) Assignee: Atofina, Paris la Defense Cedex (FR)

( * ) Notice: Subject to any disclaimer, the term of this patent is extended or adjusted under 35 U.S.C. 154(b) by 26 days.

(21) Appl. No.: 09/769,739

(22) Filed: Jan. 26, 2001

(65) Prior Publication Data

US 2001/0051256 A1 Dec. 13, 2001

(30) Foreign Application Priority Data

Jan. 26, 2000 (FR) .............................................. 00 00973

(51) Int. Cl.$^7$ .......................... B32B 27/08; B32B 27/30; B32B 27/32; B32B 27/34; B32B 27/36
(52) U.S. Cl. ................. 428/411.1; 428/421; 428/475.8; 428/476.1; 428/476.3; 428/476.9; 428/480; 428/483; 428/500; 428/516; 428/519; 428/520; 428/521; 428/522; 428/523; 428/914
(58) Field of Search ................................ 428/31, 411.1, 428/421, 475.8, 476.1, 476.3, 476.9, 480, 483, 516, 520, 519, 521, 522, 523, 914, 500

(56) References Cited

U.S. PATENT DOCUMENTS

| | | | |
|---|---|---|---|
| 4,563,393 A | | 1/1986 | Kitagawa et al. |
| 4,692,357 A | * | 9/1987 | Mayumi et al. .......... 427/393.5 |
| 5,658,670 A | * | 8/1997 | Fukushi et al. ............. 428/421 |
| 5,725,712 A | * | 3/1998 | Spain et al. ................ 156/230 |
| 6,319,438 B1 | * | 11/2001 | Smith et al. .................. 264/75 |

FOREIGN PATENT DOCUMENTS

WO    WO 94 03337    2/1994

* cited by examiner

Primary Examiner—Ramsey Zacharia
(74) Attorney, Agent, or Firm—Millen, White, Zelano & Branigan, P.C.

(57) ABSTRACT

The present invention relates to a thermoformable multilayer film comprising in succession:

- a protective layer (A);
- a transparent layer (B) comprising (by weight the total amount being 100%) 0 to 100% of a fluoropolymer (B1) and 100 to 0% of a polymer (B2) essentially consisting of alkyl (meth)acrylate units;
- a layer (C) based on a polyamide with amine terminal groups;
- a layer (D) consisting of a polyolefin functionalized by an unsaturated carboxylic acid anhydride;
- a bonding layer (E) made of a polyolefin, said film being obtained by coextruding the various layers, said film being used to cover various substrates, for example by injection-moulding the substrate in the melt onto the multilayer film placed in the bottom of an injection mould, the layer (A) of the film being placed against the wall of the mould.

23 Claims, No Drawings

THERMOFORMABLE MULTILAYER FILM FOR THE PROTECTION OF SUBSTRATES AND OBJECTS OBTAINED

FIELD OF THE INVENTION

The present invention relates to a thermoformable multilayer film for the protection of substrates and to the objects thus obtained.

Use is made, particularly in the motor-vehicle industry, of many body components made of plastic, such as bumpers, wing mirrors, the bonnet and increasingly all the other components such as the doors and wings. These components have the advantage of being lighter than the same components made of steel, of being insensitive to corrosion and of having superior mechanical properties. These components are produced by melt-injection-moulding and/or thermo-forming of a thermoplastic. However, there is a technical difficulty, namely that it is much more difficult to paint them than steel components. One solution consists in covering these components with a coloured film, this film possibly being a monolayer or a multilayer. Usually, this film is placed in the bottom of a mould and then the molten plastic (the substrate) is injected onto it and, after cooling and demoulding, the component coated with the coloured film— this is the technique of overmoulding. The adhesion of the film is provided by contact between the molten plastic and the film, causing that surface of the film facing the injection of the molten plastic to melt and thus to be welded. It is also possible to coextrude the substrate and the coloured film, to coat the substrate on the coloured film or to hot-press the substrate onto the coloured film, and then optionally to thermoform the assembly.

The present invention relates to these films and to the substrates coated using this technique.

PRIOR ART

Patent U.S. Pat. No. 5,514,427 proposes the use of the so-called solvent casting technique for uniformly dispersing pigments, dyes and fillers in a multilayer film. The solvent casting technology consists firstly in producing a liquid thermoplastic polymer composition in a solvent containing the actual polymers, the dispersion of pigments and the additives meeting a given specification. This liquid composition is then uniformly deposited on a supporting strip. The latter is taken into a drying oven in which the solvents are extracted by evaporation and in which the composition is melted in order to form a continuous layer. The continuous film is then wound up. The structure of the film comprises, bearing from the inside (the substrate side; which is made of a polyolefin or acrylonitrile-butadiene-styrene) to the outside, a layer of a chlorinated polyolefin, an acrylic adhesive layer and a pigmented layer based on a fluoropolymer and on alkyl methacrylate.

Patent WO 99/37479 describes a multilayer film obtained by the technique called solvent casting and lamination, which has, respectively from the inside (substrate side) to the outside, an adhesive layer of the pressure-sensitive adhesive type, an opaque pigmented layer of a fluoropolymer in which the fillers have no particular orientation and a transparent layer based on a fluoropolymer.

Patent EP 949,120 proposes a multilayer film consisting, from the inside to the outside, of a polymer support layer (polyolefin, acrylo-nitrile-butadiene-styrene, polyamide, etc.), of a methacrylate base layer, of a colour-pigmented fluorinated layer (with no particular orientation) and of a transparent fluorinated layer, it then being possible for this film to be overmoulded by various substrates, such as polyolefin or polyamide substrates.

Patent U.S. Pat. No. 5,725,712 proposes a thermoformable multilayer film obtained by lamination, consisting, from the inside to the outside, of an adhesive layer, of a pigmented colour layer, in which the fillers have no particular orientation, and of a transparent layer.

Patent U.S. Pat. No. 5,707,697 describes an external decorated and weather-resistant body component. This component consists of a multilayer film, obtained by the technique called solvent casting, followed by lamination, and of a substrate. The structure of the film comprises, from the inside to the outside, a chlorinated polyolefin layer capable of adhering to a polyolefin substrate, a pigmented colour fluoropolymer-based layer in which the fillers do not have any particular orientation and a transparent flouropolymer layer having a shiny appearance.

Patent WO 96/40480 describes a multilayer structure which, from the inside to the outside, has a reinforcing layer (of the ABS type) coated by coextrusion with an adhesion primer (acrylic), then with a coloured layer consisting of a PVDF-based copolymer as a blend with an acrylic and of a transparent surface layer consisting of a blend of homopolymer PVDF with an acrylic.

Patent WO 94/03337 proposes a multilayer consisting, from the inside to the outside, of a substrate, of an adherent layer consisting of a compound compatible with the substrate, of a reinforcing layer, of a coloured layer which contains pigments in an acrylic, urethane or vinyl matrix, and finally of a transparent layer based on PVDF and PMMA having a compositional gradient. The reinforcing layer may consist of PBT, PET, ABS, PVC, PA, a polyester, PC, a polyolefin, an ethylene-alkyl (meth)acrylate copolymer, an acrylic polymer or a blend of at least any two of these polymers.

U.S. Pat. No. 5,658,670 describes a two-layer film obtained by coextrusion and hot-pressing of a layer of PVDF or derivatives and of an amine-modified PA, polyurethane or polyolefin layer.

Patent Application JP 09-193189 A, published on Jul. 29, 1997, describes a film comprising 4 layers which, from the inside to the outside, are a polypropylene layer, a filled (pigmented) polypropylene layer, a layer of an ethylene-glycidyl methacrylate copolymer and a transparent surface layer based on polymethyl methacrylate (PMMA), respectively.

Patents FR 2,740,384 and FR 2,740,385 describe a film possessing three of four layers based on a polyamide and on chemically modified polypropylene, allowing decorated surfaces to be produced.

THE TECHNICAL PROBLEM

In the films of the prior art, the weak point is the adhesion of the fluoropolymer layer to the other layers. Multilayer films useful for the protection and decoration of substrates have now been found, these films having an external layer made of a fluoropolymer or PMMA or mixtures thereof adhering perfectly to the substrate. The film of the invention is also much simpler to manufacture than that of the prior art; in particular it requires no solvent.

BRIEF DESCRIPTION OF THE INVENTION

The present invention relates to a thermoformable multilayer film comprising in succession:

a protective layer (A);

a transparent layer (B) comprising (by weight the total amount being 100%) 0 to 100% of a fluoropolymer (B1) and 100 to 0% of a polymer (B2) essentially consisting of alkyl (meth)acrylate units;

a layer (C) based on a polyamide with amine terminal groups;

a layer (D) consisting of a polyolefin functionalized by an unsaturated carboxylic acid anhydride;

a bonding layer (E) made of a polyolefin.

This film is obtained by coextruding the various layers, the layer (A) possibly being laminated using the standard technique for thermoplastics. This film is then used to cover various substrates, for example by injection-moulding the substrate in the melt onto the multilayer film placed in the bottom of an injection mould, the layer (A) of the film being placed against the wall of the mould.

The present invention also relates to substrates coated with these films.

DETAILED DESCRIPTION OF THE INVENTION

The protective layer (A) is a temporary layer allowing the shiny and transparent layer (B) to be protected during the steps of handling, thermoforming, and injection-moulding the film. This protective layer makes it possible to maintain or promote a given surface finish. Thus, this layer may be smooth or rough, depending on the desired surface finish. This layer avoids the use of a demoulding agent capable of degrading the surface finish of (B). Advantageously, this layer has a thickness of between 10 and 150 $\mu$m and preferably from 50 to 100 $\mu$m. The materials that can be used to produce this layer may be chosen from (i) saturated polyesters, such as PET and PBT, copolyesters and polyetheresters and (ii) polyolefin homopolymers or copolymers, such as polyethylenes or polypropylenes. By way of example, mention may be made of the PET sold under the brand name MYLAR® by DuPont. This layer may contain various fillers, such as $TiO_2$, silica, kaolin, calcium carbonate, aluminium flakes and derivatives thereof.

The transparent surface layer (B) is formed from a polymer or a blend of polymers making it possible to obtain a transparent shiny surface resistant to chemical or external attack or to UV. This layer, advantageously has a thickness ranging from 10 to 200 $\mu$m and preferably from 70 to 140 $\mu$m.

By way of example of fluoropolymers (B1), mention may most particularly be made of:

PVDFs, vinylidene fluoride (VF2) homopolymers and vinylidene fluoride (VF2) copolymers preferably containing at least 50% by weight of VF2 and at least one other fluoromonomer, such as chlorotrifluoroethylene (CTFE), hexafluoropropylene (HFP), trifluoroethylene (VF3) and tetrofluoroethylene (TFE);

trifluoroethylene (VF3) homopolymers and copolymers;

copolymers, and especially terpolymers, combining residues of chlorotrifluoroethylene (CTFE), tetrafluoroethylene (TFE) hexafluoropropylene (HFP) and/or ethylene units and optionally VF2 and/or VF3 units.

Among these fluoropolymers (B1), it is advantageous to use PVDF.

If the layer (B) contains (B1) it is recommended to add the other polymer (B2), which makes it possible to increase the adhesion to the layer (C). This polymer (B2), essentially consisting of alkyl (meth)acrylate units, may also include acid, acid chloride, alcohol or anhydride functional groups. By way of example of polymer (B2), mention may be made of the homopolymers of an alkyl (meth)acrylate. Alkyl (meth)acrylates, described in KIRK-OTHMER, Encyclopaedia of Chemical Technology, 4th edition in Vol. 1, pages 292–293 and in Vol. 16, pages 475–478. Mention may also be made of copolymers of at least two of these (meth)acrylates and copolymers of at least one (meth)acrylate with at least one monomer chosen from acrylonitrile, butadiene, styrene or isoprene, provided that the proportion of (meth)acrylate is at least 50 mol %. Advantageously, (B2) is PMMA. These polymers (B2) consist either of the monomers and optionally the comonomers mentioned above and do not contain an impact modifier or they contain, in addition, an acrylic impact modifier. The acrylic impact modifiers are, for example, random or block copolymers of at least one monomer chosen from styrene, butadiene, isoprene and at least one monomer chosen from acrylonitrile and alkyl (meth)acrylates; they may be of the core-shell type. These acrylic impact modifiers may be blended with the polymer (B2) once it has been produced or may be introduced during the polymerization of (B2) or they may be produced simultaneously during the polymerization of (B2). The amount of acrylic impact modifier may, for example, be from 0 to 30 parts per 100 to 70 parts of (B2) and advantageously from 5 to 20 parts per 95 to 20 parts of (B2). It would not be outside the scope of the invention if (B2) were a blend of two or more of the above polymers.

The layer (B) may comprise (B1) or (B2). As regards the layer (B) comprising (B1), advantageously this layer (B) comprises 50 to 100 parts (by weight) of (B1) per 0 to 50 parts of (B2) and preferably comprises 60 to 80 parts (by weight) of (B1) per 40 to 20 parts of (B2). Suitable polymers in the case of (B2) are SUMIPEX TR® from Sumotomo® and OROGLASS HT121® from Atoglass and, in the case of (B2), KYNAR 720® from Elf Atochem. This layer may contain various organic and/or inorganic fillers, for example UV absorbers of the TINUVIN® family from Ciba Speciality Chemicals; this layer may also contain pigments or dyes. This layer has very good resistance to the various fluids used in motor vehicles, such as petrol, coolant, windscreen-washer liquid, brake fluid, engine oil and hydraulic transmission fluid. Very good preservation over time of the surface finish and surface appearance of the film is obtained.

Using the extrusion technique, it is possible to orient the pigments or dyes in this layer in the flow direction, making the appearance of the film anisotropic. To do this, all that is required is to use pigments having an anisotropic aspect ratio. By choosing pigments with an isotropic aspect ratio (aspect ratio close to 1) this effect may advantageously be eliminated. This orientation of the pigments gives an interferential effect.

The layer (C) is a homopolymer or copolymer polyamide having amine terminal groups or a blend of polyamides, at least one having amine terminal groups. The term "polyamide" should be understood to mean the products from the condensation:

of one or more amino acids, such as aminocaproic, 7-aminoheptanoic, 11-aminoundecanoic and 12-aminododecanoic acids, or of one or more lactams such as caprolactam, oenantholactam and lauyllactam;

of one or more salts or mixtures of diamines, such as hexamethylenediamine, dodecamethylenediamine, metaxylylenediamine, bis (p-aminocyclohexyl) methane and trimethylhexamethylenediamine, with diacids, such as isophthalic, terephthalic, adipic, azelaic, suberic, sebacic and dodecanedicarboxylic acids.

By way of examples of polyamides, mention may be made of PA-6, PA-6,6, PA-11 and PA-12.

Advantageously, it is also possible to use copolyamides. Mention may be made of the copolyamides resulting from the condensation of at least two α, ω-aminocarboxylic acids or of two lactams or of a lactam and of an α,ω-aminocarboxylic acid. Mention may also be made of the copolyamides resulting from the condensation of at least one α,ω-aminocarboxylic acid (or a lactam), at least one diamine and at least one dicarboxylic acid.

By way of examples of lactams, mention may be made of those having from 3 to 12 carbon atoms in the main ring and which can be substituted. Mention may be made, for example, of β,β-dimethylpropiolactam, α,α-dimethylpropiolactam, amylolactam, caprolactam, capryllactam and lauryllactam.

By way of examples of α,ω-aminocarboxylic acids, mention may be made of aminoundecanoic acid and aminododecanoic acid. By way of examples of dicarboxylic acids, mention may be made of adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated), and dodecanedioic acid HOOC—$(CH_2)_{10}$—COOH.

The diamine may be an aliphatic diamine having from 6 to 12 carbon atoms; it may be a saturated cyclic and/or arylic diamine. By way of example, mention may be made of hexamethylenediamine, piperazine, tetramethylenediamine, octamethylenediamine, decamethylenediamine, dodecamethylenediamine, 1,5-diamino-hexane, 2,2,4-trimethyl-1,6-diaminohexane, diamine polyols, isophorone diamine (IPD), methyl-pentamethylenediamine (MPDM), bis(aminocyclo-hexyl)methane (BACM), bis(3-methyl-4-aminocyclo-hexyl)methane (BMACM).

By way of examples of copolyamides, mention may be made of copolymers of caprolactam and of lauryllactam (PA-6/12), copolymers of caprolactam, adipic acid and hexamethylenediamine (PA-6/6,6), copolymers of caprolactam, lauryllactam, adipic acid and hexamethylenediamine (PA-6/12/6,6), copolymers of caprolactam, lauryllactam, 11-aminoundecanoic acid, azelaic acid and hexamethylenediamine (PA-6/6,9/11/12), copolymers of caprolactam, lauryllactam, 11-aminoundecanoic acid, adipic acid and hexamethylenediamine (PA-6/6,6/11/12), copolymers of lauryllactam, azelaic acid and hexamethylenediamine (PA-6,9/12). Advantageously, the copolyamide is chosen from PA-6/12 and PA-6/6,6. The advantage of these copolyamides is their lower melting point than that of PA-6.

In order to obtain amine terminal groups, all that is required is to carry out the synthesis in the presence of an excess of diamine or, in the case of polyamides (and copolyamides) which are manufactured from a lactam or from an α,ω-aminocarboxylic acid, to use a diamine or a monoamine as a chain stopper.

By way of example, mention may be made of (1) blends of miscible polyamides and (2) single-phase blends resulting from the transamidification of a polyamide and of an amorphous semi-aromatic polyamide. Advantageous blends are those which are still crystalline and transparent, that is to say microcrystalline, for example blends comprising, by weight, 70% PA-12 and 30% PA-12/BMACM-I/BMACM-T, "I" and "T" denoting isophthalic and terephthalic acids, respectively. Mention may also be made of PA BMACM-12 and PA PACM-12 (PACM stands for paraaminodicyclohexylmethane).

It would not be outside the scope of the inventionto use blends of polyamides with a polyolefin. Advantageously, these blends have a polyamide matrix, that is to say they contain (by weight) 55 to 100 parts of polyamide per 0 to 45 parts of polyolefin, the polyolefin possibly being functionalized or being a blend of a functionalized polyolefin with an unfunctionalized polyolefin. By way of example, use may be made of the functionalized and unfunctionalized polyolefins described in the layer (D).

A particularly suitable polyamide is the PA-12 AESNO TL® from Elf Atochem®, which makes it possible, if (B2) contains functional groups, to produce, via a chemical reaction, a covalent bond, stable over time, with the anhydride, acid, acid chloride or alcohol functional groups of the polymer B2. The thickness of this layer is advantageously between 5 and 200 µm and preferably between 70 and 140 µm. This layer may contain various organic and/or inorganic fillers, for example UV absorbers of the TINUVIN® family from Ciba Speciality Chemicals; this layer may also contain pigments or dyes.

Using the extrusion technique, it is possible to orient the pigments or dyes in this layer in the flow direction, making the appearance of the film anisotropic. To do this, all that is required is to use pigments having an anisotropic aspect ratio. By choosing pigments with an isotropic aspect ratio (aspect ratio close to 1), this effect may advantageously be eliminated. This orientation of the pigments give an interferential effect.

This layer participates with the layer (B) in the appearance and protection of the substrate.

The layer (D) consists of a polyolefin functionalized by an unsaturated carboxylic acid anhydride. The presence of the anhydride functional group allows an imidation reaction with the amine functional groups of the layer (C), making it possible to form a bond stable over time. This functionalized polyolefin is often described in the prior art as a coextrusion binder.

Conventionally, a polyolefin is a homopolymer or copolymer of α-olefins or of diolefins, such as, for example, ethylene, propylene, 1-butane, 1-octene and butadiene. By way of examples, mention may be made of:

ethylene homopolymers and copolymers, particularly LDPE, HDPE, LLDPE (linear low-density polyethylene), VLDPE (very low-density polyethylene) and metallocene polyethylene;

propylene homopolymers or copolymers;

ethylene/α-olefin copolymers, such as ethylene/propylene, EPR (ethylene-propylene rubber) and ethylene/propylene/diene (EPDM) copolymers;

styrene/ethylene-butylene/styrene (SEBS), styrene/butadiene/styrene (SBS), styrene/isoprene/styrene (SIS) and styrene/ethylene-propylene/styrene (SEPS) block copolymers;

copolymers of ethylene with at least one product chosen from unsaturated carboxylic acid esters or salts, such as alkyl (meth)acrylate (for example methyl acrylate), or vinyl esters of saturated carboxylic acids, such as vinyl acetate, the proportion of comonomer possibly being up to 40% by weight.

The functionalized polyolefin of the layer (D) may be an α-olefin polymer having unsaturated carboxylic acid anhydride units. By way of example, mention may be made of the above polyolefins grafted or copolymerized by unsaturated carboxylic acid anhydrides. The grafting processes are known by those skilled in the art. It would not be outside the scope of the inventionto use unsaturated carboxylic acids as well as the derivatives of these acids and anhydrides. By way of examples, mention may be made of acrylic acid, methacrylic acid, maleic acid, fumaric acid, itaconic acid, crotonic acid, itaconic anhydride, nadic anhydride, maleic anhydride and substituted maleic anhydrides such as, for example, dimethylmaleic anhydride. By way of examples of derivatives, mention may be made of the salts, amides, imides and esters, such as sodium monomaleate and dimaleate, dimethyl acrylamide, maleimide and fumarate; the (meth)acrylic acid may be completely or partially neutralized by metals such as Zn, Ca and Li. A functionalized polyolefin is, for example, a PE/EPR blend, the ratio by weight of which may vary greatly, for example between 40/60 and 90/10, the said blend being cografted with an anhydride, especially maleic anhydride, with a grafting level for example.of 0.01 to 5% by weight.

Advantageously, (D) is based on polypropylene for example essentially comprising polypropylene homopolymer or copolymer functionalized by grafting with at least one unsaturated carboxylic acid, an unsaturated carboxylic acid anhydride or derivatives of these acids and anhydrides. These products have already been mentioned above. Advantageously, polypropylene with an MFI (Melt flow Index) of 0.1 to 10 g/10 minutes (at 230° C./2.16 kg) is grafted with maleic anhydride in the presence of initiators such as peroxides. The amount of maleic anhydride effectively grafted may be between 0.1 and 10% by weight of the grafted polypropylene. The grafted polypropylene may be diluted with polypropylene, EPR or EPDM rubbers, or propylene/α-olefin copolymers. It is also possible, according to another variant, to cograft a polypropylene/EPR or EPDM blend, that is to say to add an unsaturated carboxylic acid, an anhydride or derivatives thereof in a polypropylene/EPR or EPDM blend in the presence of an initiator.

By way of other examples of constituents of the layer (D), mention may be made of the blends comprising, by weight:
- 0 to 50% and preferably 10 to 40% of at least one polyethylene or an ethylene copolymer;
- 50 to 100% and preferably 60 to 90% of at least one polymer chosen from polypropylene or a propylene copolymer, poly(1-butene) homopolymer or copolymer and polystyrene homopolymer or copolymer, and preferably polypropylene.
- these blends being grafted by a functional monomer chosen from carboxylic acids and their derivatives, acid chlorides, isocyanates, oxazolines, epoxides, amines or hydroxyls, and preferably unsaturated dicarboxylic acid anhydrides;
- these grafted blends optionally being diluted in at least one polyolefin essentially comprising propylene units or in at least one polymer having an elastomeric character, or in a blend thereof.

Polymers that can be used for this layer (D) are, for example, the grafted polypropylenes from Elf Atochem and from DuPont sold under the brand names OREVAC PPFT® and BYNEL 50E561®, respectively.

The thickness of this layer is advantageously between 10 and 250 $\mu$m and preferably between 40 and 110 $\mu$m. This layer may contain various organic and/or inorganic fillers, for example UV absorbers of the TINUVIN® family from Ciba Speciality Chemicals; this layer may also contain pigments or dyes.

Using the extrusion technique, it is possible to orient the pigments or dyes in this layer in the flow direction, making the appearance of the film anisotropic. To do this, all that is required is to use pigments having an anisotropic aspect ratio. By choosing pigments with an isotropic aspect ratio (aspect ratio close to 1) this effect may advantageously be eliminated. This orientation of the pigments gives an interferential effect.

The bonding layer (E), which makes it possible to bond to the substrate, is a polyolefin—the polyolefins were defined in the layer (D). These materials have sufficient compatibility and sufficient affinity in order to allow bonding between the layer (D) and the substrate. Advantageously, polypropylene is used. Materials perfectly suitable for producing this layer are the polypropylenes 3050 BN1 and 3060 MN5 from Appryl. The thickness of this layer is advantageously between 400 and 800 $\mu$m and preferably between 500 and 600 $\mu$m. This layer may contain various organic and/or inorganic fillers, for example UV absorbers from the TINUVIN® family from Ciba Speciality Chemicals; this layer may also contain pigments or dyes.

Using the extrusion technique, it is possible to orient the pigments or dyes in this layer in the flow direction, making the appearance of the film anisotropic. To do this, all that is required is to use pigments having an anisotropic aspect ratio. By choosing pigments with an isotropic aspect ratio (aspect ratio close to 1), this effect may advantageously be eliminated. This orientation of the pigments gives an interferential effect.

The film of the invention is manufactured by coextrusion using a standard technique for thermoplastics, in which the molten material of the various layers is forced through sheet dies placed very close to each other; the combination of molten materials forms the multilayer film which is cooled by passing over controlled-temperature rolls. By adjusting the speeds of rolls placed in the machine direction and/or rolls placed in the cross direction, it is possible to stretch the film in the machine direction and/or in the cross direction.

The MFIs of the various layers are chosen to be as close as possible, between 1 and 20 (at 230°/2.16 kg) and are advantageously between 4 and 7; this choice falls within the scope of those skilled in the art of coextrusion.

The multilayer film of the invention is useful for covering substrates, either by overmoulding or by coextrusion or by coating or by hot-pressing. Advantageously, the overmoulding technique is used. If the mould is of simple shape, the injection moulding moulding of the substrate in the melt is sufficient to press the film against the wall of the mould; in this case the film is used as obtained. If the mould is of more complicated shape, to avoid stresses in the film and to ensure a good contact between the film and the walls of the moulds, it is necessary to preform the film by thermoforming before putting it into the mould. It is possible to use another mould of the same, shape and, with the aid of a component having the same shape, but as the positive, the film is thermoformed; it is also possible to use the same mould which serves for injection-moulding the substrate. It is also possible, in the case of conditions intermediate between those of the above, not to carry out thermoforming but to put the film as it is in the mould and, using compressed air on the side where the substrate is injection-moulded, to press the film against the wall of the mould. It is also possible to create a vacuum on the other side of the film in order to press it against the wall of the mould.

If the film has to be thermoformed, the products used must have a thermoforming temperature range encompassing as wide as possible a range. By way of example, Table 1 below mentions the melting point ($T_m$), the minimum thermoforming temperature ($TFT_{min}$) and the maximum thermoforming temperature ($TFT_{max}$) of various constituents of the layers of the film of the invention.

TABLE 1

Thermoforming temperature range.

| PRODUCT | $T_m$ (° C.) | $TFT_{min}$ | $TFT_{max}$ |
|---|---|---|---|
| polypropylene homopolymer | 165–175 | $T_m$ − 25° C. | $T_m$ + 5° C. |
| polypropylene copolymer | 160–171 | $T_m$ − 30° C. | $T_m$ + 30° C. |
| maleicized polypropylene | 160–175 | $T_m$ − 25° C. | $T_m$ + 5° C. |
| PA-6 | 210–221 | $T_m$ − 25° C. | $T_m$ + 5° C. |
| PA-6/6,6 | 180–190 | $T_m$ − 25° C. | $T_m$ + 20° C. |
| PA-11 | 183–192 | $T_m$ − 25° C. | $T_m$ + 5° C. |
| PA-12 | 178–180 | $T_m$ − 25° C. | $T_m$ + 5° C. |
| PA-6/polyolefin blend | 200–225 | $T_m$ − 25° C. | $T_m$ + 5° C. |
| PVDF homopolymer | 168–172 | $T_m$ − 25° C. | $T_m$ + 5° C. |
| PMMA | Tg = 90 – 105 | Tg + 20° C. | Tg + 60° C. |
| PVDF/PMMA (60/40) | 168–172 | $T_m$ − 25° C. | $T_m$ + 5° C. |

The various layers may contain fillers and additives, provided that the transparency properties of the upper layer (B) and the colours and colour effects of the entire structure are not affected.

The invention is particularly useful for covering polypropylene substrates.

EXAMPLES

Example 1

We have produced films according to the invention on an ER-WE-PA® machine equipped with 4 extruders called O, I, A and B respectively, the characteristics of which are given in Table 2.

TABLE 2

Description of the extruders

| | Screw diameter in mm | Length/Diameter |
|---|---|---|
| Extruder O | 90 | 32 |
| Extruder I | 60 | 30 |
| Extruder A | 50 | 24 |
| Extruder B | 38 | 24 |

A lamellar layer distribution unit was used to carry out the coextrusion, together with a 950 mm wide coat-hanger die. The film was calendered on a horizontal calender consisting of three independently temperature-controlled rolls. In all cases, the films were produced at a speed of 5 m/minute, using roll temperatures of 30° C. for the roll closest to the die, 40° C. for the intermediate roll and 20° C. for the roll furthest away. The layer (B) consists of a blend of 60% by weight of KYNAR® 720 (PVDF homopolymer having an MVI (Melt Volume Index) of 10 cm$^3$/10 minutes (230° C./5 kg)) and 40% by weight of OROGLAS® HT121 (PMMA (MMA/methacrylic acid copolymer) containing 3.8% acid and having an MFI of 2 g/10 minutes (230° C./3.8 kg)) and 0.6% by weight of TINUVIN 1577 (UV absorber sold by Ciba Speciality Chemicals) with respect to the total weight of resin. This layer has a thickness of 100 µm. This layer is coextruded onto the layer (C), consisting of ULTRAMID® B36F (amine-terminated PA-6 having an MVI of 5 cm$^3$/10 minutes at 235° C./2.16 kg). This layer has a thickness of 35 µm. This layer is coextruded onto the layer (D) which is a BYNEL® 50E561 (anhydride-modified polypropylene having an MVI of 5 cm$^3$/10 minutes at 190° C./2.16 kg). This layer has a thickness of 75 µm. This layer is coextruded onto the layer (E) consisting of a blend of 94% by weight of APPRYL 3050 BN1 polyproplyene (polypropylene homopolymer having an MVI of 5 cm$^3$/10 minutes (190° C./2.16 kg)) and 6% by weight of a green master batch SANYLENE® AU VERDE A13 GR from Clariant. This layer has a thickness of 550 µm. The layer (B) is extruded with a temperature profile ranging from 180 to 260° C. The layer (C) is extruded with a temperature profile ranging from 200 to 250° C. The layer (D) is extruded with a temperature profile ranging from between 180° C. and 230° C. The layer (E) is extruded with a temperature profile ranging from 200° C. to 230° C. The temperature of the die and of the distribution system is 265° C. Next, this structure is thermoformed at 190° C. and placed in an injection mould, in order to overmould it with APPRYL® 3131 MU7 polypropylene from Appryl.

Example 2

We have produced films according to the invention on an ER-WE-PA® machine equipped with 4 extruders called O, I, A and B respectively, the characteristics of which are given in Table 3.

TABLE 3

Description of the extruders

| | Screw diameter in mm | Length/Diameter |
|---|---|---|
| Extruder O | 90 | 32 |
| Extruder I | 60 | 30 |
| Extruder A | 50 | 24 |
| Extruder B | 38 | 24 |

A lamellar layer distribution unit was used to carry out the coextrusion, together with a 950 mm wide coat-hanger die. The film was calendered on a horizontal calender consisting of three independently temperature-controlled rolls. In all cases, the films were produced at a speed of 5 m/minute, using roll temperatures of 30° C. for the roll closest to the die, 40° C. for the intermediate roll and 20° C. for the roll furthest away. The layer (B) consists of a blend of 60% by weight of KYNAR® 720 (PVDF homopolymer having an MVI (Melt Volume Index) of 10 cm$^3$/10 minutes (230° C./5 kg)) and 40% by weight of OROGLAS® HT121 (PMMA (MMA/methacrylic acid copolymer) containing 3.8% acid and having an MFI of 2 g/10 minutes (230° C./3.8 kg)) and 0.6% by weight of TINUVIN® 1577 (UV absorber sold by Ciba Speciality Chemicals) with respect to the total weight of resin. This layer has a thickness of 100 µm. This layer is coextruded onto the layer (C), consisting of ULTRAMID® B36F (amine-terminated PA-6 having an MVI of 5 cm$^3$/10 minutes at 235° C./2.16 kg). This layer has a thickness of 35 µm. This layer is coextruded onto the layer (D) which is a OREVAC PP-FT (polypropylene grafted by maleic anhydride and having an MFI of 4 g/10 minutes (1900° C./2.16 kg)). This layer has a thickness of 75 µm. This layer is coextruded onto the layer (E) consisting of a blend of 94% by weight of APPRYL 3050 BN1 polyproplyene (polypropylene homopolymer having an MVI of 5 cm$^3$/10 minutes (190° C./2.16 kg)) and 6% by weight of a green master batch SANYLENE® AU VERDE A13 GR from Clariant. This layer has a thickness of 550 µm. The layer (B) is extruded with a temperature profile ranging from 180 to 260° C. The layer (C) is extruded with a temperature profile ranging from 200 to 250° C. The layer (D) is extruded with a temperature profile ranging from between 180° C. and 230° C. The layer (E) is extruded with a temperature profile ranging from 200° C. to 230° C. The temperature of the die and of the distribution system is 265° C. Next, this structure is thermoformed at 190° C. and placed in an injection mould, in order to overmould it with APPRYL® 3131 MU7 polypropylene from Appryl.

EXAMPLE 3

We have produced films according to the invention on an ER-WE-PA® machine equipped with 4 extruders called O, I, A and B respectively, the characteristics of which are given in Table 4.

TABLE 4

Description of the extruders

| | Screw diameter in mm | Length/Diameter |
|---|---|---|
| Extruder O | 90 | 32 |
| Extruder I | 60 | 30 |
| Extruder A | 50 | 24 |
| Extruder B | 38 | 24 |

A lamellar layer distribution unit was used to carry out the coextrusion, together with a 950 mm wide coat-hanger die. The film was calendered on a horizontal calender consisting of three independently temperature-controlled rolls. In all cases, the films were produced at a speed of 5 m/minute, using roll temperatures of 30° C. for the roll closest to the die, 40° C. for the intermediate roll and 20° C. for the roll furthest away. The layer (B) consists of a blend of 80% by weight of KYNAR® 720 (PVDF homopolymer having an MVI (Melt Volume Index) of 10 cm$^3$/10 minutes (230° C./5 kg)) and 20% by weight of OROGLAS® HT121 (PMMA (MMA/methacrylic acid copolymer) containing 3.8% acid and having an MFI of 2 g/10 minutes (230° C./3.8 kg)) and 0.6% by weight of TINUVIN® 234 (UV absorber sold by Ciba Speciality Chemicals) with respect to the total weight of resin. This layer has a thickness of 100 μm. This layer is coextruded onto the layer (C), consisting of a RILSAN® AESNO TL (amine-terminated PA-12 having an MVI of 2.5 (235° C./2.16 kg)) from Elf Atochem. This layer has a thickness of 35 μm. This layer is coextruded onto the layer (D) which is a BYNEL® 50E561 (anhydride-modified polypropylene having an MVI of a melt flow index of 5 g/10 minutes at 190° C./2.16 kg). This layer has a thickness of 75 μm. This layer is coextruded onto the layer (E) consisting of a blend of 94% by weight of APPRYL 3060 MN5 polyproplyene (polypropylene block copolymer having an MVI of 6.5 cm$^3$/10 minutes (190° C./2.16 kg)) and 6% by weight of a green master batch SANYLENE® AU VERDE A13 GR from Clariant. This layer has a thickness of 550 μm. The layer (B) is extruded with a temperature profile ranging from 180 to 260° C. The layer (C) is extruded with a temperature profile ranging from 200 to 250° C. The layer (D) is extruded with a temperature profile ranging from between 180° C. and 230° C. The layer (E) is extruded with a temperature profile ranging from 200° C. to 230° C. The temperature of the die and of the distribution system is 265° C. Next, this structure is thermoformed at 190° C. and placed in an injection mould, in order to overmould it with APPRYL® 3131 MU7 polypropylene from Appryl.

EXAMPLE 4

We have produced films according to the invention on an ER-WE-PA® machine equipped with 4 extruders called O, I, A and B respectively, the characteristics of which are given in Table 5.

TABLE 5

Description of the extruders

| | Screw diameter in mm | Length/Diameter |
|---|---|---|
| Extruder O | 90 | 32 |
| Extruder I | 60 | 30 |
| Extruder A | 50 | 24 |
| Extruder B | 38 | 24 |

A lamellar layer distribution unit was used to carry out the coextrusion, together with a 950 mm wide coat-hanger die. The film was calendered on a horizontal calender consisting of three independently temperature-controlled rolls. In all cases, the films were produced at a speed of 5 m/minute, using roll temperatures of 30° C. for the roll closest to the die, 40° C. for the intermediate roll and 20° C. for the roll furthest away. The layer (B) consists of a blend of 80% by weight of KYNAR® 720 (PVDF homopolymer having an MVI (Melt Volume Index) of 10 cm$^3$/10 minutes (230° C./5 kg)) and 20% by weight of OROGLAS® HT121 (PMMA (MMA/methacrylic acid copolymer) containing 3.8% acid and having an MFI of 2 g/10 minutes (230° C./3.8 kg)). This layer has a thickness of 25 μm. This layer is coextruded onto the layer (C), consisting of an ORGALLOY® A (a blend of 65% of amine-terminated PA-6 having a melt (MFI) of 15–17 g/10 minutes (235° C./2.16 kg), 27% of an LDPE having a melt flow index of 1 g/10 minutes (190° C.) and 8% of an ethylene-butyl acrylate-maleic anhydride copolymer containing 5.5% acrylate and 3.6% anhydride, having a melt flow index of 5 g/10 minutes). This layer has a thickness of 25 μm. This layer is coextruded onto the layer (D) which is an OREVAC PP-FT, a polypropylene grafted by maleic anhydride, having an MFI of 4 g/10 minutes (190° C./2.16 kg). This layer has a thickness of 75 μm. This layer is coextruded onto the layer (E) consisting of a blend of 97% by weight of APPRYL 3060 MN5 polypropylene (a polypropylene block copolymer having an MVI of 6.5 cm$^3$/10 minutes (190° C./2.16 kg)) and 3% by weight of a green master batch SANYLENE® AU VERDE A13 GR from Clariant. This layer has a thickness of 450 μm. The layer (B) is extruded with a temperature profile ranging 180 to 260° C. The layer (C) is extruded with a temperature profile ranging from 200 to 250° C. The layer (D) is extruded with a temperature profile ranging from 180° C. to 230° C. The layer (E) is extruded with a temperature profile ranging from 200° C. to 230° C. The temperature of the die and of the distribution system is 265° C. Next, this structure is thermoformed at 190° C. and placed in an injection mould, in order to overmould it with APPRYL® 3131 MU7 polypropylene from Appryl.

EXAMPLE 5

We have produced films according to the invention on an ER-WE-PA® machine equipped with 4 extruders called O, I, A and B respectively, the characteristics of which are given in Table 6.

TABLE 6

Description of the extruders

| | Screw diameter in mm | Length/Diameter |
|---|---|---|
| Extruder O | 90 | 32 |
| Extruder I | 60 | 30 |

TABLE 6-continued

| | Description of the extruders | |
|---|---|---|
| | Screw diameter in mm | Length/Diameter |
| Extruder A | 50 | 24 |
| Extruder B | 38 | 24 |

A lamellar layer distribution unit was used to carry out the coextrusion, together with a 950 mm wide coat-hanger die. The film was calendered on a horizontal calender consisting of three independently temperature-controlled rolls. In all cases, the films were produced at a speed of 5 m/minute, using roll temperatures of 30° C. for the roll closest to the die, 40° C. for the intermediate roll and 20° C. for the roll furthest away. The layer (B) consists of a blend of 80% by weight of KYNAR® 720 (PVDF homopolymer having an MVI (Melt Volume Index) of 10 cm$^3$/10 minutes (230° C./5 kg)) and 20% by weight of OROGLAS® HT121 (PMMA (MMA/methacrylic acid copolymer) containing 3.8% acid and having an MFI of 2 g/10 minutes (230° C./3.8 kg)). This layer has a thickness of 25 μm. This layer is coextruded onto the layer (C), consisting of an ULTRAMID® C35F (an amine-terminated PA-6/6,6 having an MVI of 7 cm$^3$/10 minutes (235° C./2.16 kg)). This layer has a thickness of 25 μm. This layer is coextruded onto the layer (D) which is an OREVAC® PP-FT (a polypropylene grafted by maleic anhydride, having an MFI of 4 g/10 minutes (190° C./2.16 kg)). This layer has a thickness of 75 μm. This layer is coextruded onto the layer (E) consisting of a blend of 97% by weight of APPRYL 3060 MN5 polypropylene (a polypropylene block copolymer having an MVI of 6.5 cm$^3$/10 minutes (190° C./2.16 kg)) and 3% by weight of a green master batch SANYLENE® AU VERDE A13 GR from Clariant. This layer has a thickness of 450 μm. The layer (B) is extruded with a temperature profile ranging from 180 to 260° C. The layer (C) is extruded with a temperature profile ranging from 200 to 250° C. The layer (D) is extruded with a temperature profile ranging from 180° C. to 230° C. The layer (E) is extruded with a temperature profile ranging from 200° C. to 230° C. The temperature of the die and of the distribution system is 265° C. Next, this structure is thermoformed at 190° C. and placed in an injection mould, in order to overmould it with APPRYL® 3131 MU7 polypropylene from Appryl.

EXAMPLE 6

We have produced films according to the invention on an ER-WE-PA® machine equipped with 4 extruders called O, I, A and B respectively, the characteristics of which are given in Table 7.

TABLE 7

| | Description of the extruders | |
|---|---|---|
| | Screw diameter in mm | Length/Diameter |
| Extruder O | 90 | 32 |
| Extruder I | 60 | 30 |
| Extruder A | 50 | 24 |
| Extruder B | 38 | 24 |

A lamellar layer distribution unit was used to carry out the coextrusion, together with a 950 mm wide coat-hanger die. The film was calendered on a horizontal calender consisting of three independently temperature-controlled rolls. In all cases, the films were produced at a speed of 5 m/minute, using roll temperatures of 30° C. for the roll closest to the die, 40° C. for the intermediate roll and 20° C. for the roll furthest away. The layer (B) consists of a blend of 60% by weight of KYNAR® 720 (PVDF homopolymer having an MVI (Melt Volume Index) of 10 cm$^3$/10 minutes (230° C./5 kg)) and 40% by weight of OROGLAS® HT121 (PMMA (MMA/methacrylic acid copolymer) containing 3.8% acid and having an MFI of 2 g/10 minutes (230° C./3.8 kg)). This layer has a thickness of 25 μm. This layer is coextruded onto the layer (C), consisting of a RILSAN AESNO TL (an amine-terminated PA-12 having an MVI of 2.5 235° C./2.16 kg)) from Elf Atochem. This layer has a thickness of 25 μm. This layer is coextruded onto the layer (D) which is a OREVAC® PP-FT (polypropylene grafted by maleic anhydride and having an MFI of 4 g/10 minutes (190° C./2.16 kg)).

This layer has a thickness of 75 μm. This layer is coextruded onto the layer (E) consisting of a blend of 97% by weight of APPRYL 3060 MNS polypropylene (a polypropylene block copolymer having an MVI of 6.5 cm$^3$/10 minutes (190° C./2.16 kg)) and 3% by weight of a green master batch SANYLENES AU VERDE A13 GR from Clariant. This layer has a thickness of 450 μm.

The layer (B) is extruded with a temperature profile ranging from 180 to 260° C. The layer (C) is extruded with a temperature profile ranging from 200 to 250° C. The layer (D) is extruded with a temperature profile ranging from 180° C. to 230° C. The layer (E) is extruded with a temperature profile ranging from 200° C. to 230° C. The temperature of the die and of the distribution system is 265° C. Next, this structure is thermoformed at 190° C. and placed in an injection mould, in order to overmould it with APPRYL® 3131 MU7 polypropylene from Appryl.

EXAMPLE 7

We have produced films according to the invention on an ER-WE-PA® machine equipped with 4 extruders called O, I, A and B respectively, the characteristics of which are given in Table 8.

TABLE 8

| | Description of the extruders | |
|---|---|---|
| | Screw diameter in mm | Length/Diameter |
| Extruder O | 90 | 32 |
| Extruder I | 60 | 30 |
| Extruder A | 50 | 24 |
| Extruder B | 38 | 24 |

A lamellar layer distribution unit was used to carry out the coextrusion, together with a 950 mm wide coat-hanger die. The film was calendered on a horizontal calender consisting of three independently temperature-controlled rolls. In all cases, the films were produced at a speed of 5 m/minute, using roll temperatures of 30° C. for the roll closest to the die, 40° C. for the intermediate roll and 20° C. for the roll furthest away. The layer (B) consists of a blend of 80% by weight of KYNAR® 720 (PVDF homopolymer having an MVI (Melt Volume Index) of 10 cm$^3$/10 minutes (230° C./5 kg)) and 20% by weight of OROGLAS® HT121 (PMMA (MMA/methacrylic acid copolymer) containing 3.8% acid and having an MFI of 2 g/10 minutes (230° C./3.8 kg)). This layer has a thickness of 25 μm. This layer is coextruded onto the layer (C), consisting of an ULTRAMID B36 F (an amine-terminated PA-6 having an MVI of 5 cm$^3$/10 minutes at 235° C./2.16 kg). This layer has a thickness of 25 μm.

This layer is coextruded onto the layer (D) which is an OREVAC® PP-FT polypropylene grafted by maleic anhydride, having an MFI of 4 g/10 minutes (190° C./2.16 kg).

This layer has a thickness of 75 μm. This layer is coextruded onto the layer (E) consisting of a blend of 97% by weight of APPRYL 3060 MN5 polypropylene (a polypropylene block copolymer having an MVI of 6.5 cm³/10 minutes (190° C./2.16 kg)) and 3% by weight of a green master batch SANYLENE® AU VERDE A13 GR from Clariant. This layer has a thickness of 450 μm.

The layer (B) is extruded with a temperature profile ranging from 180 to 260° C. The layer (C) is extruded with a temperature profile ranging from 200 to 250° C.

The layer (D) is extruded with a temperature profile ranging from between 180° C. and 230° C. The layer (E) is extruded with a temperature profile ranging from 200° C. to 230° C. The temperature of the die and of the distribution system is 265° C. Next, this structure is thermoformed at 190° C. and placed in an injection mould, in order to overmould it with APPRYL® 3131 MU7 polypropylene from Appryl.

EXAMPLE 8

We have produced films according to the invention on an ER-WE-PA® machine equipped with 4 extruders called O, I, A and B respectively, the characteristics of which are given in Table 9.

TABLE 9

| | Description of the extruders | |
|---|---|---|
| | Screw diameter in mm | Length/Diameter |
| Extruder O | 90 | 32 |
| Extruder I | 60 | 30 |
| Extruder A | 50 | 24 |
| Extruder B | 38 | 24 |

A lamellar layer distribution unit was used to carry out the coextrusion, together with a 950 mm wide coat-hanger die. The film was calendered on a horizontal calender consisting of three independently temperature-controlled rolls. In all cases, the films were produced at a speed of 5 m/minute using roll temperatures of 30° C. for the roll closest to the die, 40° C. for the intermediate roll and 20° C. for the roll furthest away. The layer (B) consists of a blend of 80% by weight of KYNAR® 720 (PVDF homopolymer having an MVI (Melt Volume Index) of 10 cm³/10 minutes (230° C./5 kg)) and 20% by weight of OROGLAS® HT121 (PMMA (MMA/methacrylic acid copolymer) containing 3.8% acid and having an MFI of 2 g/10 minutes (230° C./3.8 kg)). This layer has a thickness of 25 μm. This layer is coextruded onto the layer (C), consisting of a RILSAN® AESNO TL (an amine-terminated PA-12 having an MVI of 2.5 (235° C./2.16 kg)) from Elf Atochem. This layer has a thickness of 25 μm. This layer is coextruded onto the layer (D) which is a OREVAC® PP-FT polypropylene grafted by maleic anhydride and having an MFI of 4 g/10 minutes (190° C./2.16 kg). This layer has a thickness of 75 μm. This layer is coextruded onto the layer (E) consisting of a blend of 97% by weight of APPRYL 3060 MN5 polypropylene (a polypropylene block copolymer having an MVI of 6.5 cm³/10 minutes (190° C./2.16 kg)) and 3% by weight of a green master batch SANYLENE® AU VERDE A13 GR from Clariant. This layer has a thickness of 450 μm.

The layer (B) is extruded with a temperature profile ranging from 180 to 260° C. The layer (C) is extruded with a temperature profile ranging from 200 to 250° C. The layer (D) is extruded with a temperature profile ranging from between 180° C. and 230° C. The layer (E) is extruded with a temperature profile ranging from 200° C. to 230° C. The temperature of the die and of the distribution system is 265° C. Next, this structure is thermoformed at 190° C. and placed in an injection mould, in order to overmould it with APPRYL® 3131 MU7 polypropylene from Appryl.

EXAMPLE 9

We have produced films according to the invention on an ER-WE-PA® machine equipped with 4 extruders called O, I, A and B respectively, the characteristics of which are given in Table 10.

TABLE 10

| | Description of the extruders | |
|---|---|---|
| | Screw diameter in mm | Length/Diameter |
| Extruder O | 90 | 32 |
| Extruder I | 60 | 30 |
| Extruder A | 50 | 24 |
| Extruder B | 38 | 24 |

A lamellar layer distribution unit was used to carry out the coextrusion, together with a 950 mm wide coat-hanger die. The film was calendered on a horizontal calender consisting of three independently temperature-controlled rolls. In all cases, the films were produced at a speed of 5 m/minute using roll temperatures of 30° C. for the roll closest to the die, 40° C. for the intermediate roll and 20° C. for the roll furthest away. The layer (B) consists of a blend of 60% by weight of KYNAR® 720 (PVDF homopolymer having an MVI (Melt Volume Index) of 10 cm³/10 minutes (230° C./5 kg)) and 40% by weight of OROGLAS® HT121 (PMMA (MMA/methacrylic acid copolymer) containing 3.8% acid and having an MFI of 2 g/10 minutes (230° C./3.8 kg)). This layer has a thickness of 25 μm. This layer is coextruded onto the layer (C), consisting of an ULTRAMID® C35F (an amine-terminated PA-6/6, 6 having an MVI of 7 cm³/10 minutes (235° C./2.16 kg)). This layer has a thickness of 25 μm. This layer is coextruded onto the layer (D) which is an OREVAC® PP-FT (polypropylene grafted by maleic anhydride and having an MFI of 4 g/10 minutes (190° C./2.16 kg)). This layer has a thickness of 75 μm. This layer is coextruded onto the layer (E) consisting of a blend of 97% by weight of APPRYL 3060 MN5 polypropylene (a polypropylene block copolymer having an MVI of 6.5 cm³/10 minutes (190° C./2.16 kg)) and 3% by weight of a green master batch SANYLENE® AU VERDE A13 GR from Clariant. This layer has a thickness of 450 μm. The layer (B) is extruded with a temperature profile ranging from 180 to 260° C. The layer (C) is extruded with a temperature profile ranging from 200 to 250° C. The layer (D) is extruded with a temperature profile ranging from between 180° C. and 230° C. The layer (E) is extruded with a temperature profile ranging from 200° C. to 230° C. The temperature of the die and of the distribution system is 265° C. Next, this structure is thermoformed at 190° C. and placed in an injection mould, in order to overmould it with APPRYL® 3131 MU7 polypropylene from Appryl.

EXAMPLE 10

We have produced films according to the invention on an ER-WE-PA® machine equipped with 4 extruders called O, I, A and B respectively, the characteristics of which are given in Table 11.

TABLE 11

| Description of the extruders | | |
|---|---|---|
| | Screw diameter in mm | Length/Diameter |
| Extruder O | 90 | 32 |
| Extruder I | 60 | 30 |
| Extruder A | 50 | 24 |
| Extruder B | 38 | 24 |

A lamellar layer distribution unit was used to carry out the coextrusion, together with a 950 mm wide coat-hanger die. The film was calendered on a horizontal calender consisting of three independently temperature-controlled rolls. In all cases, the films were produced at a speed of 5 m/minute using roll temperatures of 30° C. for the roll closest to the die, 40° C. for the intermediate roll and 20° C. for the roll furthest away. The layer (B) consists of a blend of 60% by weight of KYNAR® 720 (PVDF homopolymer having an MVI (Melt Volume Index) of 10 cm$^3$/10 minutes (230° C./5 kg)) and 40% by weight of OROGLAS® HT121 (PMMA (MMA/methacrylic acid copolymer) containing 3.8% acid and having an MFI of 2 g/10 minutes (230° C./3.8 kg)). This layer has a thickness of 25 µm. This layer is coextruded onto the layer (C), consisting of an ORGALLOY A (a blend of 65% of an amine-terminated PA-6 having a melt flow index (MFI) of 15–17 g/10 minutes (235° C./2.16 kg), 27% of an LDPE having a melt flow index of 1 g/10 minutes (190° C.) and 8% of an ethylene-butyl acrylate-maleic anhydride copolymer containing 5.5% acrylate and 3.6% anhydride, having a melt flow index of 5). This layer has a thickness of 25 µm. This layer is coextruded onto the layer (D) which is an OREVAC® PP-FT polypropylene grafted by maleic anhydride and having an MFI of (190° C./2.16 kg).

This layer has a thickness of 75 µm. This layer is coextruded onto the layer (E) consisting of a blend of 97% by weight of APPRYL 3060 MN5 polypropylene (a polypropylene block copolymer having an MVI of 6.5 cm$^3$/10 minutes (190° C./2.16 kg)) and 3% by weight of a green master batch SANYLENE® AU VERDE A13 GR from Clariant. This layer has a thickness of 450 µm.

The layer (B) is extruded with a temperature profile ranging from 180 to 260° C. The layer (C) is extruded with a temperature profile ranging from 200 to 250° C. The layer (D) is extruded with a temperature profile ranging from between 180° C. and 230° C. The layer (E) is extruded with a temperature profile ranging from 200° C. to 230° C. The temperature of the die and of the distribution system is 265° C. Next, this structure is thermoformed at 190° C. and placed in an injection mould, in order to overmould it with APPRYL® 3131 MU7 polypropylene from Appryl.

EXAMPLE 11

We have produced films according to the invention on an ER-WE-PA® machine equipped with 4 extruders called O, I, A and B respectively, the characteristics of which are given in Table 12.

TABLE 12

| Description of the extruders | | |
|---|---|---|
| | Screw diameter in mm | Length/Diameter |
| Extruder O | 90 | 32 |
| Extruder I | 60 | 30 |
| Extruder A | 50 | 24 |
| Extruder B | 38 | 24 |

A lamellar layer distribution unit was used to carry out the coextrusion, together with a 950 mm wide coat-hanger die. The film was calendered on a horizontal calender consisting of three independently temperature-controlled rolls. In all cases, the films were produced at a speed of 5 m/minute using roll temperatures of 30° C. for the roll closest to the die, 40° C. for the intermediate roll and 20° C. for the roll furthest away. The layer (B) consists of a blend of 60% by weight of KYNAR® 720 (PVDF homopolymer having an MVI (Melt Volume Index) of 10 cm$^3$/10 minutes (230° C./5 kg)) and 40% by weight of OROGLAS® HT121 (PMMA (MMA/methacrylic acid copolymer) containing 3.8% acid and having an MFI of 2 g/10 minutes (230° C./3.8 kg)). This layer has a thickness 25 µm. This layer has a thickness of 25 µm. This layer is coextruded onto the layer (C), consisting of an ULTRAMID B36 F (an amine-terminated PA-6 having an MVI of 5 cm$^3$/10 minutes at 235° C./2.16 kg). This layer has a thickness of 25 µm. This layer is coextruded onto the layer (D) which is an OREVAC® PP-FT polypropylene grafted by maleic anhydride and having an MFI of 4 g/10 minutes (190° C./2.16 kg). This layer has a thickness of 75 µm. This layer is coextruded onto the layer (E) consisting of a blend of 97% by weight of APPRYL 3060 MN5 polypropylene (a polypropylene block copolymer having an MVI of 6.5 cm$^3$/10 minutes (190° C./2.16 kg)) and 3% by weight of a green master batch SANYLENE® AU VERDE A13 GR from Clariant. This layer has a thickness of 450 µm.

The layer (B) is extruded with a temperature profile ranging from 180 to 260° C. The layer (C) is extruded with a temperature profile ranging from 200 to 250° C.

The layer (D) is extruded with a temperature profile ranging from between 180° C. and 230° C. The layer (E) is extruded with a temperature profile ranging from 200° C. to 230° C. The temperature of the die and of the distribution system is 265° C. Next, this structure is thermoformed at 190° C. and placed in an injection mould, in order to overmould it with APPRYL® 3131 MU7 polypropylene from Appryl.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 00/00.973, as well as the concurrently filed Preliminary Amendment are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thermoformable multilayer film comprising in succession:

a protective layer (A);

a transparent layer (B) comprising (by weight the total amount being 100%) 0 to 100% of a fluoropolymer (B1) and 100 to 0% of a polymer (B2) of alkyl (meth)acrylate units;

a layer (C) comprising a polyamide having amine terminal groups;

a layer (D) comprising a polyolefin functionalized by an unsaturated carboxylic acid anhydride;

a bonding layer (E) comprising a polyolefin.

2. A film according to claim 1, in which protective layer (A) comprises (i) a saturated polyester, copolyester or polyetherester, or (ii) a polyolefin homopolymer or copolymer.

3. A film according to claim 1, in which the fluoropolymer (B1) is part of (B) and comprises PVDF.

4. A film according to claim 1, in which the polymer (B2) is part of (B) and comprises PMMA.

5. A film according to claim 1, in which the polyamide of the layer (C) comprises PA-6, PA-12, or PA-6/6,6, each having amine terminal groups.

6. A film according to claim 1, in which the functionalized polyolefin of the layer (D) comprises grafted polypropylene optionally diluted with polypropylene, EPR or EPDM rubbers or propylene/α-olefin copolymers.

7. A film according to claim 1, in which the functionalized polyolefin of the layer (D) results from cografting said unsaturated carboxylic acid anhydride with a blend of a polypropylene/EPR or an EPDM blend.

8. A film according to claim 1, in which the functionalized polyolefin of the layer (D) comprises by weight:

0 to 50% of at least one polyethylene or an ethylene copolymer;

50 to 100% of at least one polymer selected from the group consisting of polypropylene, a propylene copolymer, poly (1-butene) homopolymer or copolymer, and polystyrene homopolymer or copolymer;

said polyolefin of layer (D) being grafted by an unsaturated carboxylic acid anhydride;

and optionally being diluted in at least one polyolefin comprising propylene units or in at least one elastomeric polymer, or in a blend thereof.

9. A film according to claim 1, in which the polyolefin of the layer (E) comprises polypropylene.

10. A substrate coated with a film according to claim 1, in which the layer (E) of the film is in contact with the substrate.

11. A substrate according to claim 10, comprising polypropylene.

12. A film according to claim 2, wherein the saturated polyester is PET or PBT and the polyolefin homopolymer is a polyethylene or polypropylene.

13. A film according to claim 8, wherein the layer (D) comprises 10 to 40% by weight of said at least one polyethylene or ethylene copolymer.

14. A film according to claim 2, in which the fluoropolymer (B1) is part of (B) and comprises PVDF.

15. A film according to claim 14, in which the polymer (B2) is part of (B) and comprises PMMA.

16. A film according to claim 15, in which the polyamide of the layer (C) comprises PA-6, PA-12, or PA-6/6,6, each having amine terminal groups.

17. A film according to claim 16, in which the functionalized polyolefin of the layer (D) comprises grafted polypropylene optionally diluted with polypropylene, EPR or EPDM rubbers or propylene/α-olefin copolymers.

18. A film according to claim 16, in which the functionalized polyolefin of the layer (D) results from cografting said unsaturated carboxylic acid anhydride with a blend of a polypropylene/EPR or an EPDM blend.

19. A film according to claim 16, in which the functionalized polyolefin of the layer (D) comprises by weight:

0 to 50% of at least one polyethylene or an ethylene copolymer;

50 to 100% of at least one polymer selected from the group consisting of polypropylene, a propylene copolymer, poly(1-butene) homopolymer or copolymer, and polystyrene homopolymer or copolymer;

said polyolefin of layer (D) being grafted by an unsaturated carboxylic acid anhydride;

and optionally being diluted in at least one polyolefin comprising propylene units or in at least one elastomeric polymer, or in a blend thereof.

20. A film according to claim 17, in which the polyolefin of the layer (E) comprises polypropylene.

21. A film according to claim 18, in which the polyolefin of the layer (E) comprises polypropylene.

22. A film according to claim 19, in which the polyolefin of the layer (E) comprises polypropylene.

23. A thermoformable multilayer film comprising in succession:

a protective layer (A);

a transparent layer (B) comprising (by weight the total amount being 100%) 0 to 100% of a fluoropolymer (B1) and 100 to 0% of a polymer (B2) of alkyl (meth)acrylate units;

a layer (C) comprising a polyamide having amine terminal groups;

a layer (D) comprising a polyolefin functionalized by an unsaturated carboxylic acid anhydride;

a bonding layer (E) different from (D), comprising a polyolefin.

* * * * *